No. 868,031. PATENTED OCT. 15, 1907.
C. M. THOMAS.
COASTING SLED.
APPLICATION FILED DEC. 17, 1906.

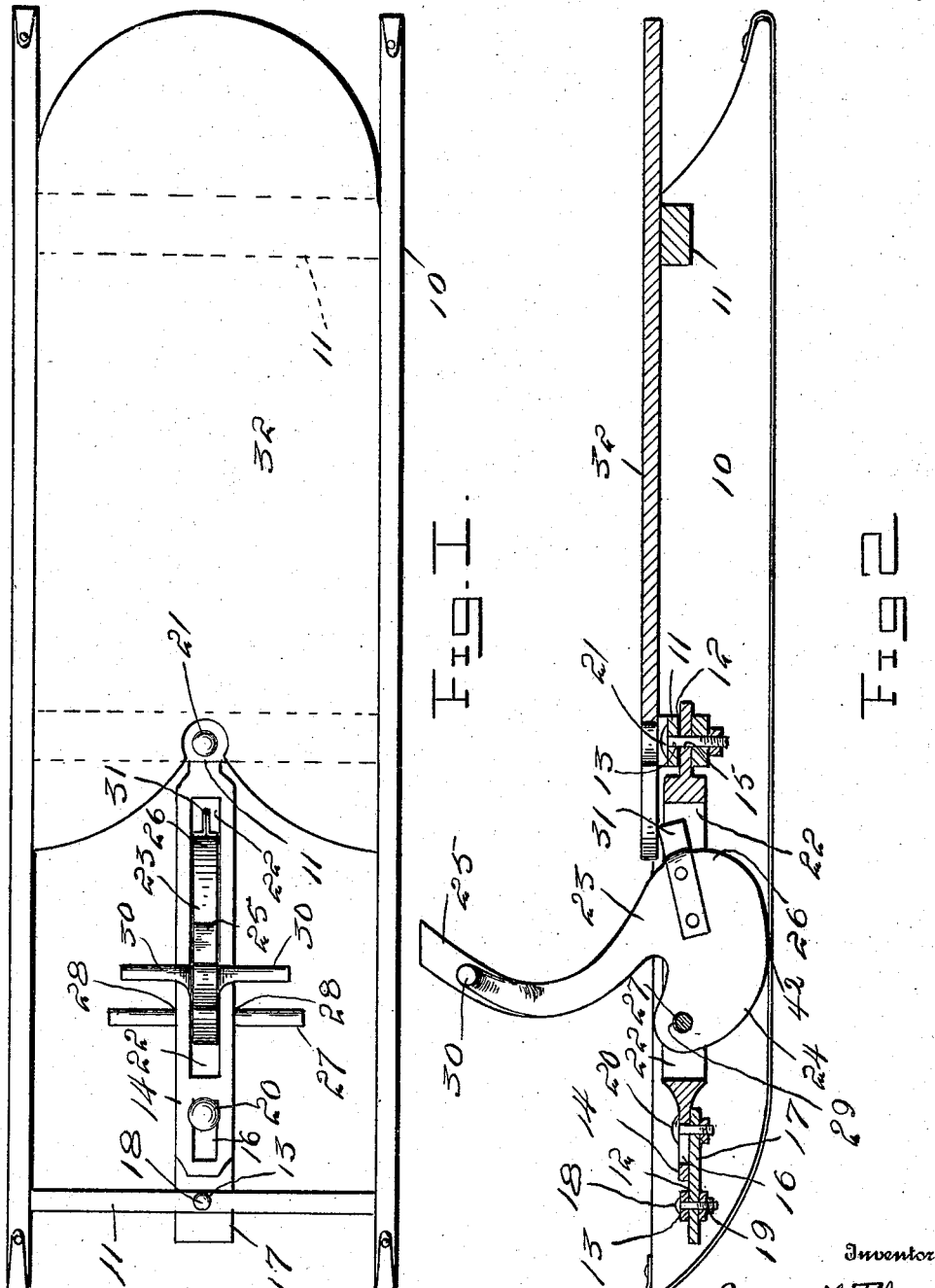

2 SHEETS—SHEET 2.

UNITED STATES PATENT OFFICE.

CASSIUS M. THOMAS, OF CAMDEN, OHIO.

COASTING-SLED.

No. 868,031.          Specification of Letters Patent.          Patented Oct. 15, 1907.

Application filed December 17, 1906. Serial No. 348,227.

*To all whom it may concern:*

Be it known that I, CASSIUS M. THOMAS, a citizen of the United States, residing at Camden, in the county of Preble, State of Ohio, have invented certain new and useful Improvements in Coasting-Sleds; and I do hereby declare the following to be a full, clear, and exact description of the invention, such as will enable others skilled in the art to which it appertains to make and use the same.

This invention has relation to sleds and sleighs generally, and particularly to coasting sleds and "runners", used in "coasting down hill".

It is the object of the invention to provide convenient and efficient means whereby the occupant of the sled may maintain his position thereon, guide it in any desired course and control its speed.

The nature of the invention is clearly shown in the device portrayed in the annexed drawings, which illustrates a form of means in which the invention may be embodied, and in view of which drawings the invention will first be described with respect to its construction and mode of operation, and then be pointed out in the subjoined claims.

Figure 3:
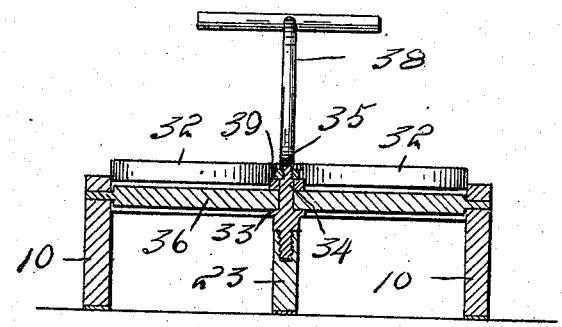
Figure 4:
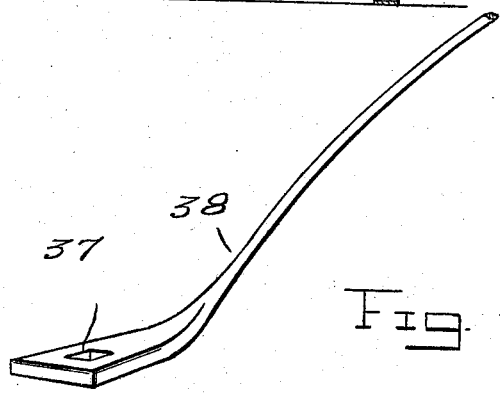
Figure 5:
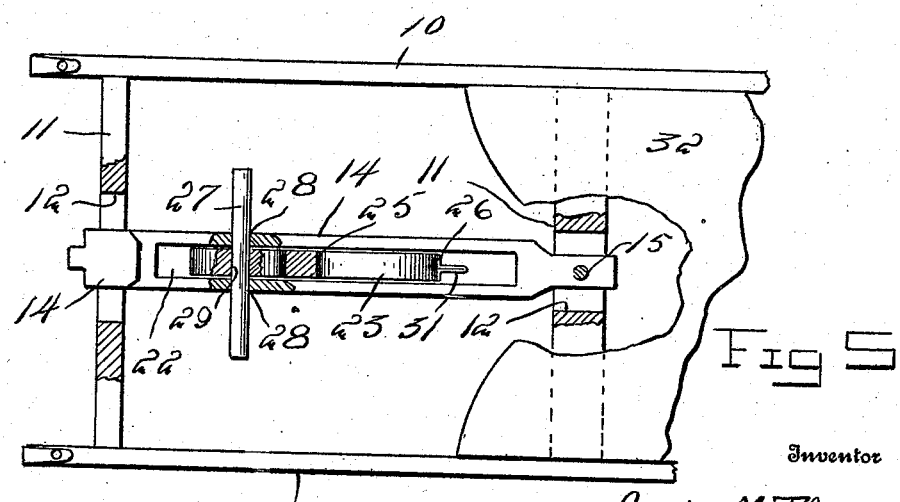

Of the drawings—Figure 1 is a plan. Fig. 2 is a longitudinal section. Fig. 3 is a transverse section of the modified form of rudder having a post extended vertically up from its nose. Fig. 4 is a perspective view of the guiding handle; and Fig. 5 is a plan partly in section showing a further modification.

Similar numerals of reference designate similar parts or features, as the case may be, wherever they occur.

In the drawings 10 designates the runners of the sled which may be of the form shown or of any other suited to the purpose. The runners are connected fore and aft by cross-bars 11 secured in or to the runners in any suitable way. Each cross-bar is provided centrally with a slot, 12, extending horizontally therethrough, and has a hole, 13, formed horizontally through the center intersecting the slot 12.

14 designates the reach-bar, which is reduced at each end and is provided with a hole, 15, formed through its rear end, and a slot, 16, through its front end. A coupling block, 17, is formed of a size and shape to enable it to be extended loosely through the slot 12 of the front cross-bar and be coupled to the latter by a pin or bolt, 18, through the hole 13 of the front cross-bar and through a hole, 19, in the forward part of the said coupling block. A pin, 20, extending up vertically from the rearward portion of the block passes through the slot 14 formed in the forward end of the reach-bar, and couples the latter and the block, the rearward reduced end of the reach-bar being extended through the slot 13 in the rear cross-bar and secured therein by a pin or bolt, 21, passing through the holes 13 and 15.

The reach-bar is provided between its reduced ends with a longitudinal slot, 22, formed vertically therethrough in which is arranged a rudder, 23, comprising a flat piece of material having an upwardly extended and rounded nose provided with a hole, 28, formed therethrough, through which and through alining holes 28 made in the reach-bar, a rod, 27, extends, pivoting the rudder on the reach-bar. The sole 24 26 of the rudder throughout is made concentric with respect to the pivot rod 27—that is, it is made in the form of a cam. The portion of the rudder extending through the slot 22 of the reach-bar, affords a means for moving the said rudder from side to side when the reach-bar is moved in like manner, as it is adapted to be. The rod 27 extends at both ends to an appreciable distance beyond the sides of the reach-bar, but not to an extent to engage the sides of the runners 10. When the rudder is in normal position, as indicated in Fig. 1, its bottom or sole will lie in the same plane as the soles of the runners 10, as indicated at 42. At its upper end 25 the rudder is provided with handle bars 30, and at its rear end, 26, it is provided on each side with brake-bars 31, bolted to the sides of the runners and extending at their lower ends a little below or beyond the face of the rudder.

In use a boy or other person, taking his place upon a seat, 32, on the sled will place his feet on the projecting ends of the rod 27, and taking hold of the handle-bars 30, may start the coaster, and by pulling backward on the handle-bars will turn the rudder on or with the bar 27 bringing the rearward portion of the sole face 26 on the snow or ice, and raising the forward ends of the runners somewhat, if it is so desired, it being understood that the cam-shaped sole face of the rudder is eccentric to the pivotal connection of the latter with the reach-bar. It is to be understood, however, that when the rudder is in normal position, as shown in Fig. 1, and when the lowest point of the sole of the rudder is in the same plane with the soles of the runners 10, the sled may be guided in its course the same as though the rudder were turned on its heel 26. By the raising of the front ends of the runners slightly, as stated they will pass unevenness in their path more readily, and hence the sled may glide more easily. As the rudder is intended to guide the course of the sled, it will be seen that the rider by pushing harder on one extended end of the rod than the other will turn the rudder so that it will extend at an angle to the runners, and so cause the sled to turn to the right or left, depending on which way the rudder is turned. The turning of the rudder as specified is permitted by reason of the character of the coupling of the reach-bar 14 with the coupling block 17. By pushing back farther on the handle-bars 30 the lower ends of the brake-bars 31 will be caused to retard the speed of the sled in a manner well understood.

It is recognized that the form and arrangement of parts and features of the invention may be mechanically modified to meet circumstances, or in the application of the invention to forms of sleds or sleighs different from that shown. For example, referring to Fig. 5 the reach-bar 14 may at its forward end extend through the slot 12 in the forward cross-bar, which said slot may be longer than the slot shown in Figs. 1 and 2, and the rudder and brake devices operated precisely as before explained, excepting that the pivotal connection of the reach-bar will be with the rearward cross-bar instead of the forward bar. Again, the rudder 23 may be formed and arranged, as shown in Figs. 3 and 4 in which are shown a post or standard, 32, secured rigidly at its lower end to the upper edge of the rudder, and provided near its upper end with a collar or offset 33, and a short distance above the said collar the standard is reduced in diameter and made square in cross section, as at 34, the extreme upper end 35 being still further reduced, made round and screw-threaded. 36 designates a cross-piece extended between the runners and provided centrally with a vertical hole through which the portion of the standard above the collar 33 extends, the squared portion 34 projecting above the cross-piece and adapted to extend through the square hole 37 formed in the forward end of the guiding handle 38, which is secured in position by a nut 39 turned on the screw threaded end 35. The ends of the cross-piece 36 are reduced and made round so as to in effect form trunnions on which the said cross-piece may turn in the runners, so that by pulling back and bearing down on the handle 38 the rudder may be turned to run on its heel and so apply the brake bars 31. It is obvious that the rudder 31, as shown in Fig. 4 may have its sole face in its rear part cam shaped as in the other forms described. The runners may be constructed of wood with or without metal soles, or they may be made entirely of iron. However, the aforesaid changes fall entirely within the scope of what I claim as my invention and are not a departure from its general nature.

What is claimed is—

1. A coasting-sled and its runners, combined with slotted cross-bars extending between the runners, a slotted and laterally movable reach-bar supported at its ends in said slotted cross-bars, a rudder having its upper portion extended through the slot in the reach-bar, with which reach-bar the rudder is pivotally connected.

2. A coasting-sled and its runners, combined with slotted cross-bars, a slotted reach-bar pivotally connected at its rear end with one of the cross-bars, and arranged at its forward end to move laterally in the slot of the other cross-bar, a rudder having its upper portion extended through the slot in the reach-bar, and a pin pivotally connecting said rudder with the reach-bar.

3. A coasting sled and its runners, combined with slotted cross-bars, a slotted reach-bar pivotally connected at its rear end with one of the cross-bars, and arranged at its forward end to move laterally in the slot of the other cross-bar, a rudder having its upper portion extended through the slot in the reach-bar, and a pin pivotally connecting said rudder with the reach-bar, the ends of the said pivot-pin extending beyond the sides of the reach-bar, to afford a rest for the rider's feet and a means for governing the rudder.

4. A coasting-sled, its runners, and cross-bars extending between the runners, combined with a laterally movable and slotted reach-bar supported by the cross-bars, a rudder having an upwardly extended nose partially projected through the slot in the reach-bar and pivotally connected with the latter.

5. A coasting-sled, its runners and cross-bars extended between the runners, combined with a laterally movable and slotted reach-bar supported by the cross-bars, a rudder partially projected through the slot in the reach-bar and pivotally connected with the latter.

In testimony whereof, I affix my signature, in presence of two witnesses.

CASSIUS M. THOMAS.

Witnesses:
 E. J. PHARES,
 CLARENCE PHARES.